United States Patent
Lou et al.

(10) Patent No.: US 8,670,461 B2
(45) Date of Patent: Mar. 11, 2014

(54) APPARATUS AND METHOD OF REASSEMBLING ETHERNET DATA

(75) Inventors: Bengang Lou, Guangdong Province (CN); Shuyu Lv, Guangdong Province (CN)

(73) Assignee: ZTE Corporation, Shenzhen (CN)

( * ) Notice: Subject to any disclaimer, the term of this patent is extended or adjusted under 35 U.S.C. 154(b) by 1015 days.

(21) Appl. No.: 12/602,765

(22) PCT Filed: Dec. 27, 2007

(86) PCT No.: PCT/CN2007/003849
§ 371 (c)(1),
(2), (4) Date: Dec. 2, 2009

(87) PCT Pub. No.: WO2008/148270
PCT Pub. Date: Dec. 11, 2008

(65) Prior Publication Data
US 2010/0183030 A1    Jul. 22, 2010

(30) Foreign Application Priority Data
Jun. 7, 2007    (CN) .......................... 2007 1 0108645

(51) Int. Cl.
*H04J 3/24*    (2006.01)
(52) U.S. Cl.
USPC ....................................................... 370/474
(58) Field of Classification Search
USPC ............ 370/474, 470, 428, 395.31, 476, 389, 370/429, 463, 392, 394, 382, 252, 395.3, 370/395.71
See application file for complete search history.

(56) References Cited

U.S. PATENT DOCUMENTS

| | | | |
|---|---|---|---|
| 7,675,936 B2 * | 3/2010 | Mizutani et al. ............... | 370/466 |
| 2003/0133460 A1 | 7/2003 | Lee et al. | |
| 2007/0070997 A1 * | 3/2007 | Weitz et al. .................... | 370/389 |
| 2007/0140260 A1 * | 6/2007 | Duxbury et al. .......... | 370/395.41 |

FOREIGN PATENT DOCUMENTS

| | | |
|---|---|---|
| CN | 101056253 | 10/2007 |
| JP | 2007019592 | 1/2007 |

OTHER PUBLICATIONS

PCT; International Search Report for PCT/CN2007/003849; Apr. 3, 2008.

* cited by examiner

*Primary Examiner* — Anh Ngoc Nguyen
(74) *Attorney, Agent, or Firm* — Knobbe, Martens, Olson & Bear, LLP

(57) ABSTRACT

An Ethernet data reassembly apparatus comprises: a data receiving unit, for receiving the data of a gigabit passive optical network frame; a data reassembly unit, for storing the data of the gigabit passive optical network frame into the corresponding location of a data buffer unit, based on the Ethernet data intermediate variable stored in a data reassembly table unit; a data reassembly table unit, for storing the Ethernet data intermediate variable; and a data buffer unit, for storing the data of the gigabit passive optical network frame received by the data receiving unit, to acquire integrated Ethernet data. A method comprises the following steps: receiving the data of a gigabit passive optical network frame; storing the data of the gigabit passive optical network frame into the corresponding location of a data buffer unit, based on the Ethernet data intermediate variable stored in a data reassembly table unit. According to the present invention, ONU and OLT could perform an interleaving process for any number of data frames.

6 Claims, 7 Drawing Sheets

APPARATUS AND METHOD OF REASSEMBLING ETHERNET DATA

CROSS-REFERENCE TO RELATED APPLICATIONS

This application is the U.S. National Phase application under 35 U.S.C. §371 of International Application PCT/CN2007/003849 filed Dec. 27, 2007, which claims priority to Chinese Application 200710108645.7 filed Jun. 7, 2007. The entirety of the two of these applications is hereby incorporated by reference.

TECHNICAL FIELD

The present invention relates to the communication field, more particularly, to Ethernet data reassembly apparatus and method.

BACKGROUND OF THE INVENTION

Gigabit Passive Optical Network (GPON for short), belonging to a technology in optical access network, consists of three parts, Optical Line Terminal (OLT for short), Optical Distribution Network (ODN for short) and Optical Network Unit (ONU for short) wherein OLT and ONU are connected via passive optical distribution network (as shown in FIG. 1). Data is transmitted between OLT and ONU in the format of GPON Transmission Convergence (GTC for short) frame, which is shown in FIG. 2. As shown in FIG. 2, PLOu is short for Physical Layer Overhead upstream; PLOAMu is short for; Physical Layer Operations, Administration and Maintenance upstream; PLSu is short for Power Leveling Sequence upstream; DBRu is short for Dynamic Bandwidth Report upstream; and PCBd is short for Physical Control Block downstream.

Meanwhile, the payload part of GTC frame can bear various user data types, and the main bearer protocols are ATM (short for Asynchronous Transfer Mode) and GEM (short for GPON Encapsulation Method). GTC protocol bears GEM service in a transparent manner, wherein in the downstream direction, the frame from OLT to ONU is transmitted in GEM payload; and in the upstream direction, the service frame from ONU to OLT is transmitted in the configured GEM distribution time slot.

The structure of GEM frame is as shown in FIG. 3. The GEM frame head consists of a 12-bit PLI (short for Payload Length Indicator), a 12-bit Port Identifier (Port ID), a 3-bit PTI (short for Payload Type Indicator) and a 13-bit frame HEC (short for Head Error Control). Meanwhile, the PLI indicates the length, L, in bytes, of the payload following this header. As there are only 12 bits of PLI, it can indicate 4095 bytes at most. If the user data frame is greater than this value, it must be divided into a fragment of less than 4095 bytes. The Port-ID is used to provide 4096 unique traffic identifiers on the PON (short for Passive Optical Network), to provide traffic multiplexing. The PTI field is used to indicate the content type of the payload and its appropriate treatment, with the coding having the following meanings: 000, User data fragment, Not the end of a frame; 001, User data fragment, End of a frame; 100, GEM OAM (short for Operations, Administration and Maintenance), Not the end of a frame; 101, GEM OAM, End of a frame; other values, it is reserved. HEC is used to provide the functions of error detection and error correction of the frame head.

As the frame length of the user data is random, the GEM protocol must support the segmenting of the user data frame and inserting GEM frame head in front of each payload fragment. The PTI in the GEM frame head is just for this purpose. Each user data frame can be divided into multiple fragments, one frame head is attached in front of each fragment, and PTI is used to indicate whether the fragment is the frame tail of the user frame.

The method for encapsulating a complete Ethernet data packet into GEM is shown in FIG. 4. In the case that the service frame cannot be completely transmitted in the configured GEM distribution time slot, the Ethernet data needs to be segmented, and the segmented data needs to be reassembled in the reverse direction to restore the complete Ethernet data. The protocol of GPON requires that each ONU or OLT has at least 2 GEM reassembly processors which are used by the fragments in case of urgent time. The reassembly processor recommended by the protocol is based on Alloc-ID (short for Allocation Identifier) and T-CONT (short for Transmission Container). And each Alloc-ID or T-CONT can have one or more Port-ID transmission. In this case, it is required that ONU and OLT should not conduct interleaving processing for two or more data frames.

SUMMARY OF THE INVENTION

In view of one or more of the above problems, the present invention discloses an Ethernet data reassembly apparatus and method.

The Ethernet data reassembly apparatus according to the present invention comprises: a data receiving unit, for receiving the data of a gigabit passive optical network frame; a data reassembly unit, for storing the data of the gigabit passive optical network frame into the corresponding location of a data buffer unit, based on the Ethernet data intermediate variables stored in a data reassembly table unit; the data reassembly table unit, for storing the Ethernet data intermediate variables; and the data buffer unit, for storing the data of the gigabit passive optical network frame received by the data receiving unit, to acquire an integrated Ethernet data.

Meanwhile, the Ethernet data intermediate variable includes at least one of the following variables: the integrated length of the current Ethernet data, the storage address of the current Ethernet data, the identifier indicating whether the current Ethernet data is wrong, and the cyclic redundancy check intermediate value of the current Ethernet data.

Wherein, the data reassembly unit includes: a variable lookup unit, for looking up the Ethernet data intermediate variables in the data reassembly table unit according to the port identifier of the gigabit passive optical network frame; a frame head removing unit, for removing the frame head of the gigabit passive optical network frame; and a data adding unit, which, according to the Ethernet data intermediate variables, stores into the corresponding location of a data buffer unit the data of the gigabit passive optical network frame with the frame head removed.

Wherein, in the case that the integrated length of the current Ethernet data is 0, the data reassembly unit stores the data of the gigabit passive optical network frame into a new location of the data buffer unit. In the case that the integrated length of the current Ethernet data is not 0, the data reassembly unit stores the data of the gigabit passive optical network frame into a location of the data buffer unit corresponding to the port identifier of the gigabit passive optical network frame. In the case that the payload type indicator of the gigabit passive optical network frame is 0, the data reassembly unit writes the length of the integrated Ethernet data into the data reassembly table unit.

The Ethernet data reassembly method according to the present invention comprises the following steps: S702, receiving the data of a gigabit passive optical network frame; and S704, storing the data of the gigabit passive optical network frame into the corresponding location of a data buffer unit, based on the Ethernet data intermediate variables stored in a data reassembly table unit, to acquire the integrated Ethernet data.

Meanwhile, step S704 comprises the following steps: S7042, looking up the Ethernet data intermediate variable in a data reassembly table according to the port identifier of the gigabit passive optical network frame; and S7044, removing the frame head of the gigabit passive optical network frame, and storing according to the Ethernet data intermediate variables into the corresponding location of a data buffer unit the data of the gigabit passive optical network frame with the frame head removed.

Meanwhile, the Ethernet data intermediate variable includes at least one of the following variables: the integrated length of the current Ethernet data, the storage address of the current Ethernet data, the identifier indicating whether the current Ethernet data is wrong, and the cyclic redundancy check intermediate value of the current Ethernet data.

Meanwhile, in the case that the integrated length of the current Ethernet data is 0, the data of the gigabit passive optical network frame is stored into a new location of the data buffer unit. In the case that the integrated length of the current Ethernet data is not 0, the data of the gigabit passive optical network frame is stored into a location of the data buffer unit corresponding to the port identifier of the gigabit passive optical network frame. In the case that the payload type indicator of the gigabit passive optical network frame is 0, the length of the integrated Ethernet data is written into the data reassembly table.

To sum up, according to the present invention, the Ethernet data intermediate variable during the reassembly is stored by allocating a space to each port identifier, and the GEM frames are integrated based on the port identifier, thereby reassembly the GEM frames into the Ethernet data. With the present invention, ONU and OLT can perform an interleaving process for any number of data frames, thereby overcoming the restriction that OLT and ONU cannot perform the interleaving process for more than two data frames.

BRIEF DESCRIPTION OF DRAWINGS

The drawings herein are used to provide further understanding of the present invention and constitute a part of the present application. Exemplary embodiments of the present invention and the description thereof are used to describe the present invention and shall not be construed as improper limitations on the same, in which.

DETAILED DESCRIPTION

The embodiment of the present invention will be detailed hereinafter with reference to the figures thereof.

Figure 1:
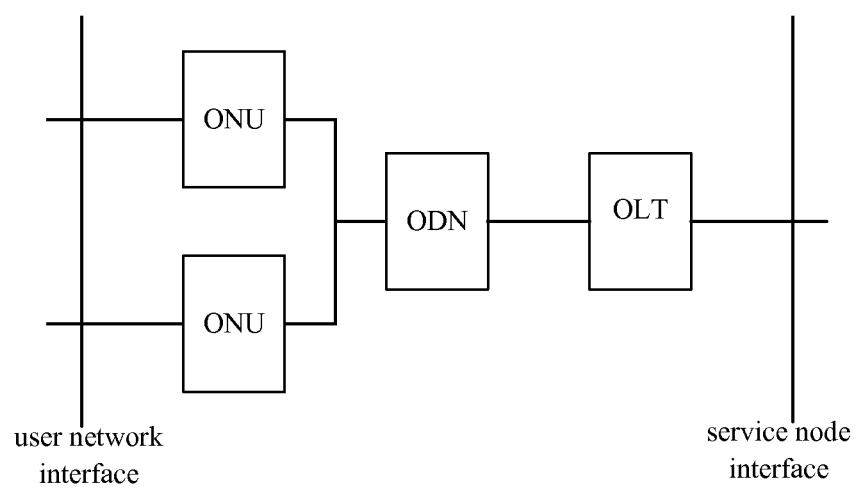
FIG. 1 is a schematic view of the structure of GPON access network.
Figure 2:
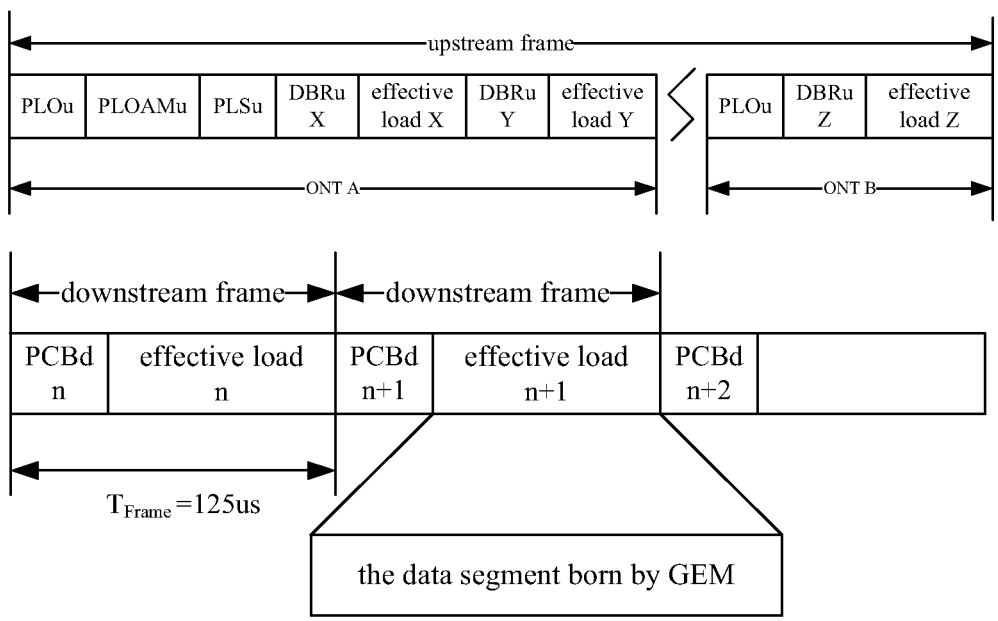
FIG. 2 is a schematic view of the structure of GTC frame.
Figures 3, 4:
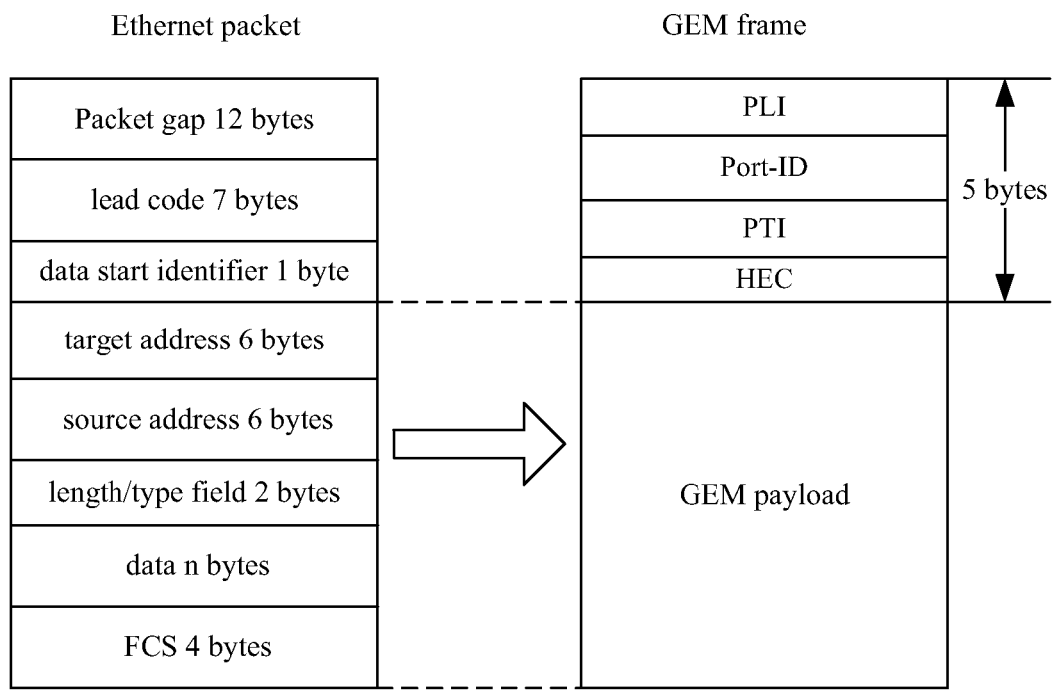
FIG. 3 is a schematic view of GEM header and frame structure.
FIG. 4 is a schematic view of frame structure for Ethernet mapping into GEM frame.
Figure 5:
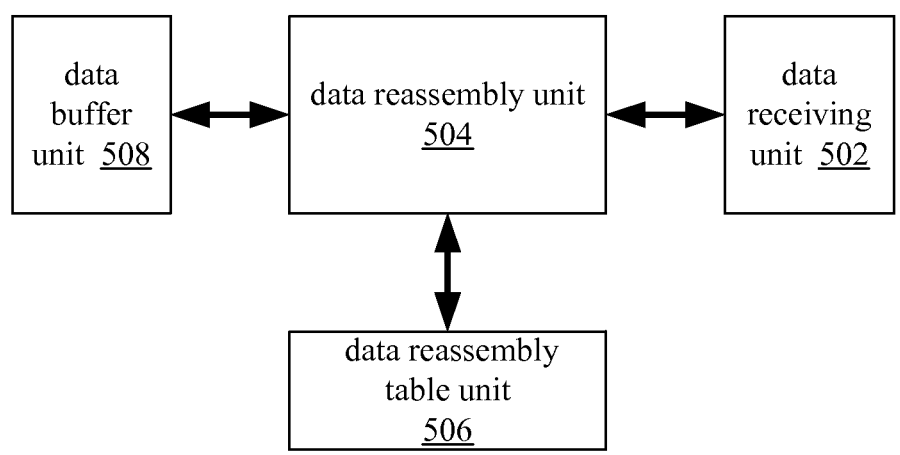
FIG. 5 is a schematic view of the structure of the Ethernet data reassembly apparatus according to the embodiment of the present invention.

Referring to FIG. 5, the Ethernet data reassembly apparatus according to the present invention is described. As shown in FIG. 5, the Ethernet data reassembly apparatus comprises: a data receiving unit 502, for receiving the data of a gigabit passive optical network frame; a data reassembly unit 504, for storing the data of the gigabit passive optical network frame into the corresponding location of a data buffer unit, based on the Ethernet data intermediate variable stored in a data reassembly table unit; a data reassembly table unit 506, for storing the Ethernet data intermediate variable; and a data buffer unit 508, for storing the data of the gigabit passive optical network frame received by the data receiving unit, to acquire the integrated Ethernet data.

Meanwhile, the data reassembly unit includes: a variable lookup unit, for looking up the Ethernet data intermediate variables in the data reassembly table unit according to the port identifier of the gigabit passive optical network frame; a frame head removing unit, for removing the frame head of the gigabit passive optical network frame; and a data adding unit, which, according to the Ethernet data intermediate variables, stores into the corresponding location of the data buffer unit the data of the gigabit passive optical network frame with the frame head removed.

Figure 6:
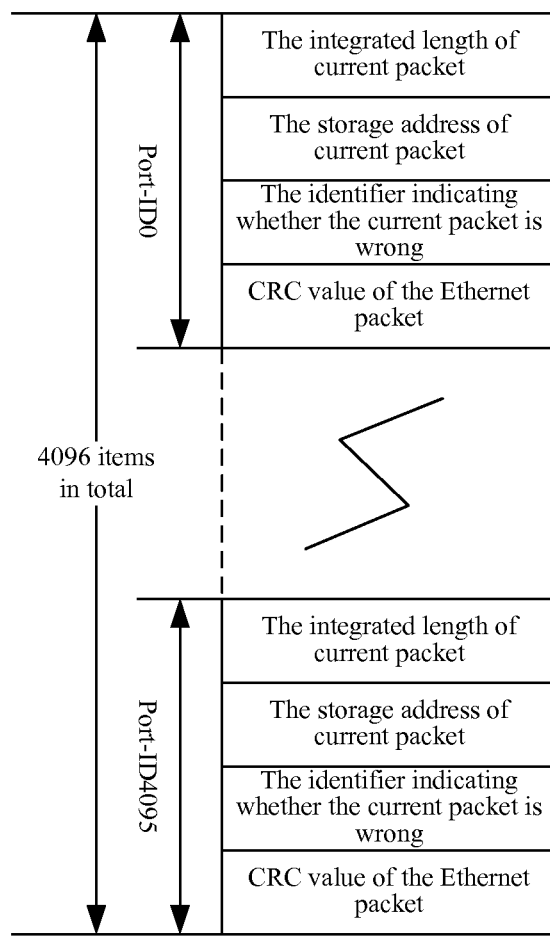
FIG. 6 is a schematic view of the structure of the data reassembly table according to the embodiment of the present invention.

Meanwhile, as shown in FIG. 6, the Ethernet data intermediate variable includes at least one of the following variables: the integrated length of the current Ethernet data, the storage address of the current Ethernet data, the identifier indicating whether the current Ethernet data is wrong, and Cyclic Redundancy Check (CRC for short) intermediate value of the current Ethernet data.

Meanwhile, the data adding unit judges whether the integrated length of the current Ethernet data in the data reassembly table unit is 0. If it is 0, it means that GEM frame is the first segment of the Ethernet data, and then the payload part of the GEM frame is written into a new space of the Ethernet data buffer unit; and if the integrated length of the current Ethernet data in the data reassembly table unit is not 0, it means that the GEM frame is another segment of the Ethernet data, and the payload part of the GEM frame is written into a space of the Ethernet data buffer unit designated in the data reassembly table unit. It is judged whether PTI is 0. If it is 0, it means that the Ethernet data is divided into multiple GEM frames, and the integrated data length is written into the data reassembly table unit, and if PTI is 1, it means that the GEM frame is the last segment of the Ethernet data, and the payload of the GEM frame is written into the Ethernet data buffer unit, thereby completing the reassembly process of the Ethernet data.

Figure 7:
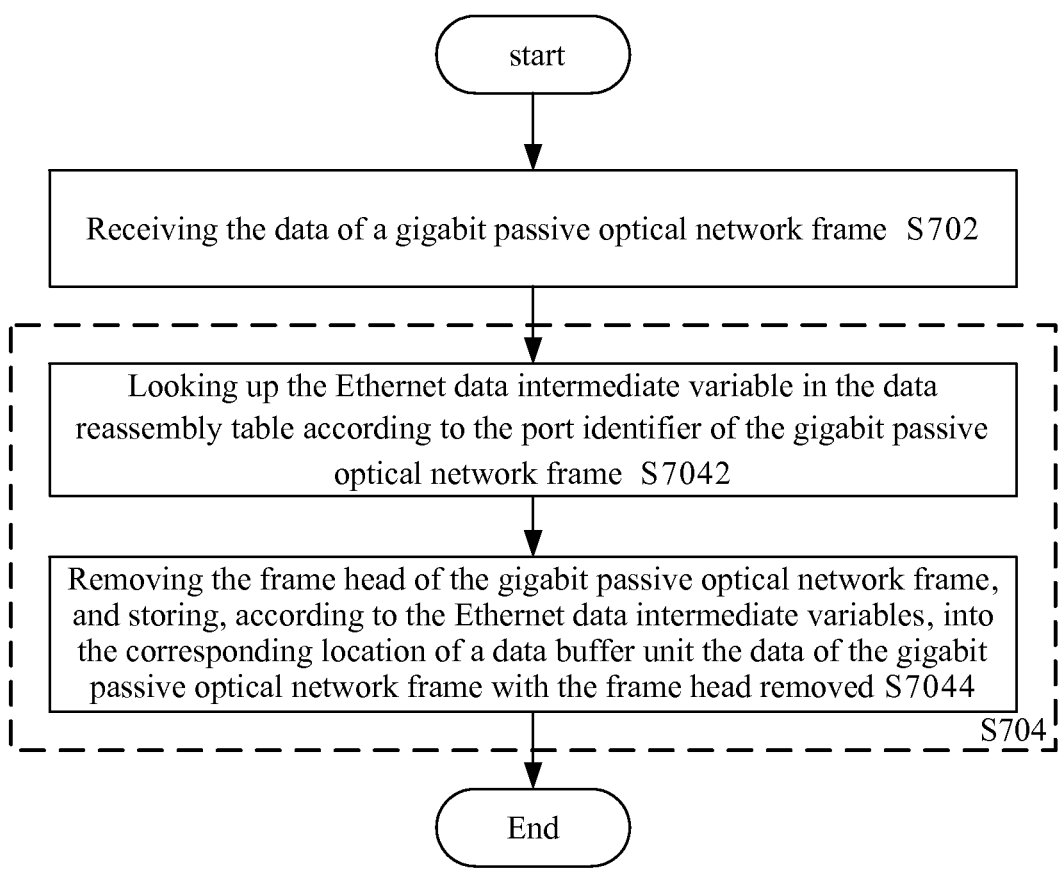
FIG. 7 is a general flow chart of the Ethernet data reassembly method according to the embodiment of the present invention.

Referring to FIG. 7, it is described a general flow of the Ethernet data reassembly method according to the embodiment of the present invention. As shown in FIG. 7, the Ethernet data reassembly method comprises the following steps: S702, receiving the data of a gigabit passive optical network frame; and S704, storing the data of the gigabit passive optical network frame into the corresponding location of the data buffer unit, based on the Ethernet data intermediate variable stored in the data reassembly table unit, to acquire integrated Ethernet data.

Meanwhile, the Step S704 comprises the following steps: S7042, looking up the Ethernet data intermediate variable in the data reassembly table according to the port identifier of the gigabit passive optical network frame; and S7044, removing the frame head of the gigabit passive optical network frame, and storing, according to the Ethernet data intermediate variables, into the corresponding location of the data buffer unit the data of the gigabit passive optical network frame with the frame head removed.

Meanwhile, the Ethernet data intermediate variable includes at least one of the following variables: the integrated length of the current Ethernet data, the storage address of the current Ethernet data, the identifier indicating whether the current Ethernet data is wrong, and the cyclic redundancy check intermediate value of the current Ethernet data.

Meanwhile, in the case that the integrated length of the current Ethernet data is 0, the data of the gigabit passive optical network frame is stored into a new location of the data buffer unit. In the case that the integrated length of the current Ethernet data is not 0, the data of the gigabit passive optical network frame is stored into a location of the data buffer unit corresponding to the port identifier of the gigabit passive optical network frame, wherein in the case that the payload type indicator of the gigabit passive optical network frame is 0, the length of the integrated Ethernet data is written into the data reassembly table.

Figure 8:
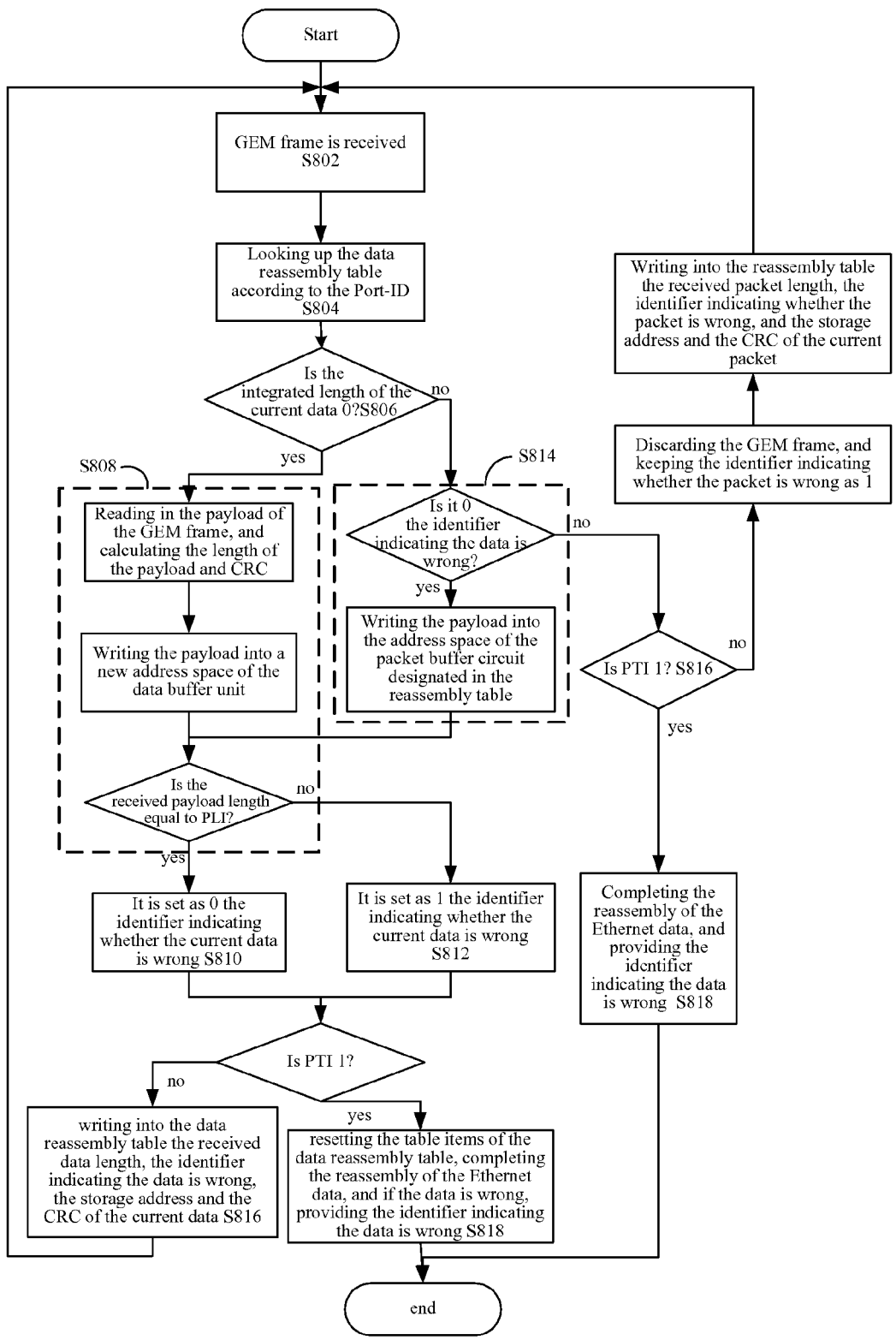
FIG. 8 is a detailed flow chart of the Ethernet data reassembly method according to the embodiment of the present invention.

Referring to FIG. 8, it is described the detailed flow of the Ethernet data reassembly method according to the embodiment of the present invention. First, the data reassembly table needs to be initialized, initializing the integrated length of the current Ethernet data as 0, the storage address of the current Ethernet data as 0, the identifier indicating whether the current Ethernet data is wrong as 0, and the cyclic redundancy check intermediate value of the current Ethernet data as full 1. As shown in FIG. 8, the Ethernet data reassembly method comprises the following steps:

S802, receiving the GEM frame;

S804, extracting the Port-ID, PTI and PLI carried by the GEM frame head, and looking up the data reassembly table according to the Port-ID;

S806, judging whether it is 0 the integrated length of the current Ethernet data which is read out from the data reassembly table, and if it is 0, it means that GEM frame is the first segment of the Ethernet data, then jumping to the Step S808, and if it is not 0, it means that the GEM frame is another segment of the Ethernet data, then jumping to the Step S814;

S808, reading the payload of the GEM frame, calculating the length and the CRC of the payload, writing the payload into the new address space of the data buffer unit, and judging whether the received payload length matches with the value of the PLI, then if they match, jumping to step S810, otherwise if not, jumping to the Step S812;

S810, if the received payload length is consistent with the PLI indication length carried in the GEM frame head, it means that the GEM frame is correct, and the identifier indicating whether the current Ethernet data is wrong is set as 0, then jumping to the Step S816;

S812, if the received payload length is inconsistent with the PLI indication length carried in the GEM frame head, it means that the GEM frame is wrong, and the identifier indicating whether the current Ethernet data is wrong is set as 1, then jumping to the Step S816;

S814, judging whether it is wrong the identifier indicating whether the current Ethernet data is wrong which is read out from the data reassembly table, if the identifier indicating whether the current Ethernet data is wrong of the current Ethernet data is 0, it means that the previous one GEM frame is not wrong, and the payload of the current GEM frame is written into the address space of the data buffer unit designated in the data reassembly table with the stored Ethernet data length as the offset address, and it is judged whether the received payload length matches with the value of the PLI, then if they match, jumping to the Step S810, otherwise jumping to the Step S812; while if the identifier indicating whether the current Ethernet data is wrong of the current Ethernet data is 1, it means that the previous one GEM frame has been wrong, and it is judged whether the GEM frame is the last one segment, that is, it is judged whether PTI is 1, and if it is the last one segment, the Ethernet data reassembly ends, jumping to the Step S818, while if it is not the last segment, it means that the Ethernet reassembly has not ended, and the identifier indicating whether the current Ethernet data is wrong is kept as 1, and the received Ethernet data length, the identifier indicating whether the Ethernet data is wrong, the storage address and the CRC of the current Ethernet data are written into the data reassembly table, then jumping to the Step S802;

S816, judging whether the PTI carried by the GEM frame head is 1, if it is 1, it means that the GEM frame is the last one segment of the Ethernet data, jumping to the Step S818; and if it is 0, it means that the Ethernet data has not ended, the received Ethernet data length, the identifier indicating whether the Ethernet data is wrong, and the storage address and the CRC of the current Ethernet data are written into the data reassembly table, jumping to the Step S802; and S818, the Ethernet data reassembly ends, and all the table items of the data reassembly table are reset.

To sum up, according to the present invention, the Ethernet data intermediate variable during the reassembly is stored by allocating a space to each port identifier, and the GEM frames are integrated based on the port identifier, thereby reassembly the GEM frames into Ethernet data. With the present invention, ONU and OLT could perform an interleaving process for any number of data frames, thereby overcoming the restriction that OLT and ONU cannot perform the interleaving process for more than two data frames.

The descriptions above are only preferable embodiments of the present invention, which are not used to restrict the present invention. For those skilled in the art, the present invention may have various changes and variations. Any amendments, equivalent substitutions, improvements, etc., within the spirit and principle of the present invention are all concluded in the scope of claims of the present invention.

What is claimed is:

1. An apparatus of reassembling Ethernet data, comprising:
   a data receiving unit, for receiving the data of a gigabit passive optical network frame;
   a data reassembly unit, for storing the data of the gigabit passive optical network frame into a corresponding location of a data buffer unit, based on the Ethernet data intermediate variable stored in a data reassembly table unit;
   the data reassembly table unit, for storing the Ethernet data intermediate variable; and
   the data buffer unit, for storing the data of the gigabit passive optical network frame received by the data receiving unit, to acquire integrated Ethernet data,
   wherein the Ethernet data intermediate variable includes at least one of the following variables: an integrated length of the current Ethernet data, a storage address of the current Ethernet data, an identifier indicating whether the current Ethernet data is wrong, and a cyclic redundancy check intermediate value of the current Ethernet data, wherein the data reassembly unit includes:
- a variable lookup unit, for looking up the Ethernet data intermediate variables in the data reassembly table unit according to a port identifier of the gigabit passive optical network frame,
- a frame head removing unit, for removing a frame head of the gigabit passive optical network frame, and
- a data adding unit, for storing, according to the Ethernet data intermediate variable, into the corresponding location of the data buffer unit the data of the gigabit passive optical network frame with the frame head removed, and wherein in the case that the integrated length of the current Ethernet data is 0, the data reassembly unit stores the data of the gigabit passive optical network frame into a new location of the data buffer unit.

2. The apparatus of reassembling Ethernet data according to claim 1, wherein in the case that the integrated length of the current Ethernet data is not 0, the data reassembly unit stores the data of the gigabit passive optical network frame into a location of the data buffer unit corresponding to the port identifier of the gigabit passive optical network frame.

3. The apparatus of reassembling Ethernet data according to claim 1, wherein in the case that the payload type indicator of the gigabit passive optical network frame is 0, the data reassembly unit writes the length of the integrated Ethernet data into the data reassembly table unit.

4. A method of reassembling Ethernet data, comprising:
- receiving the data of a gigabit passive optical network frame; and
- storing the data of the gigabit passive optical network frame into a corresponding location of a data buffer unit, based on the Ethernet data intermediate variables stored in a data reassembly table unit, to acquire integrated Ethernet data, wherein said storing further includes:
- looking up the Ethernet data intermediate variable in the data reassembly table according to a port identifier of the gigabit passive optical network frame, and
- removing a frame head of the gigabit passive optical network frame, and storing, according to the Ethernet data intermediate variables, into the corresponding location of the data buffer unit, the data of the gigabit passive optical network frame with the frame head removed, wherein the Ethernet data intermediate variable includes at least one of the following variables: an integrated length of the current Ethernet data, a storage address of the current Ethernet data, an identifier indicating whether the current Ethernet data is wrong, and a cyclic redundancy check intermediate value of the current Ethernet data, and wherein in the case that the integrated length of the current Ethernet data is the data of the gigabit passive optical network frame is stored into a new location of the data buffer unit.

5. The method of reassembling Ethernet data according to claim 4, wherein in the case the integrated length of the current Ethernet data is not 0, the data of the gigabit passive optical network frame is stored into a location of the data buffer unit corresponding to the port identifier of the gigabit passive optical network frame.

6. The method of reassembling Ethernet data according to claim 4, wherein in the case that the payload type indicator of the gigabit passive optical network frame 0, is the length of the integrated Ethernet data is written into the data reassembly table.

* * * * *

UNITED STATES PATENT AND TRADEMARK OFFICE
CERTIFICATE OF CORRECTION

PATENT NO. : 8,670,461 B2
APPLICATION NO. : 12/602765
DATED : March 11, 2014
INVENTOR(S) : Lou et al.

Page 1 of 1

It is certified that error appears in the above-identified patent and that said Letters Patent is hereby corrected as shown below:

In the Claims

In column 8 at line 21, In Claim 4, before "the data" insert --0,--.

In column 8 at line 32, In Claim 6, before "the length" delete "is".

Signed and Sealed this
Second Day of September, 2014

Michelle K. Lee
*Deputy Director of the United States Patent and Trademark Office*